United States Patent [19]

Inada et al.

[11] 4,126,084

[45] Nov. 21, 1978

[54] IGNITION TIME ADJUSTER FOR AN INTERNAL COMBUSTION ENGINE

[76] Inventors: Masami Inada, 1, Futamuradai 6-chome, Toyoake-shi, Aichi-ken; Toru Tamura, 60, Daijinden, Maenayashi-cho, Toyota-shi, Aichi-ken, both of Japan

[21] Appl. No.: 712,317

[22] Filed: Aug. 6, 1976

Related U.S. Application Data

[63] Continuation of Ser. No. 513,147, Oct. 8, 1974, abandoned.

[30] Foreign Application Priority Data

Oct. 11, 1973 [JP] Japan ............................ 48/114096

[51] Int. Cl.[2] .......................... F15B 21/10; F02P 5/10; F16K 17/32

[52] U.S. Cl. ................................ 91/443; 123/117 A; 137/513.3

[58] Field of Search ..................... 137/513.3, 854, 540, 137/543.17, 513.7; 123/117 A, 117 R; 91/443, 463

[56] References Cited

U.S. PATENT DOCUMENTS

| | | | |
|---|---|---|---|
| 2,538,364 | 1/1951 | James et al. | 137/540 |
| 2,853,159 | 9/1958 | Kuhn | 137/513.3 |
| 2,929,401 | 3/1960 | Cowan | 137/540 |
| 3,456,686 | 7/1969 | Kemble et al. | 137/540 |
| 3,638,626 | 2/1972 | Marshall | 123/117 A |
| 3,678,907 | 7/1972 | Vartanian | 123/117 A |
| 3,698,366 | 10/1972 | Gropp | 123/117 A |
| 3,699,936 | 10/1972 | Vartanian | 123/117 A |
| 3,800,756 | 4/1974 | Bishop | 123/117 A |
| 3,857,373 | 12/1974 | Martin et al. | 123/117 A |
| 3,902,469 | 9/1975 | Scott, Jr. | 123/117 A |
| 3,941,149 | 3/1976 | Mittleman | 137/854 |

*Primary Examiner*—Charles J. Myhre
*Assistant Examiner*—Andrew M. Dolinar
*Attorney, Agent, or Firm*—Holman & Stern

[57] ABSTRACT

An ignition timing adjuster for an internal combustion engine improves its exhaust gas quality.

It has a housing consisting of three housing elements rigidly united together one after another. The second or middle housing element has an axial bore for slidably guiding stem portion of a stem valve. A resilient valve is mounted on the stem valve for on-off control of the axial bore.

A second axial bore is formed through the stem valve and a porous orifice valve is fixedly mounted within this second bore.

2 Claims, 6 Drawing Figures

IGNITION TIME ADJUSTER FOR AN INTERNAL COMBUSTION ENGINE

This is a continuation of application Ser. No. 513,147 filed Oct. 8, 1974 now abandoned.

FIELD OF THE INVENTION

This invention relates to an ignition timing adjuster for an automotive engine for reducing unhealthy products contained in the exhaust gases of the engine.

BACKGROUND OF THE INVENTION

A recently advancing tendency for reducing unhealthy products in the engine exhaust gases resides in retarding the ignition timing or power timing, so called of the engine, so as to reduce the quantities of $NO_x$; HC; CO and the like. The most generally adopted means for retarding the engine power timing resides in means adapted for operational control of vacuum advancer operatively connected with the conventional distributer and under the utilization of the negative pressure prevailing in the engine intake manifold.

The operational mode of the above kind of control mechanism is such that when the accelerator pedal is depressed under the idling conditions of the engine a kind of vacuum-operated retardational operation is employed for retarding the execution of timing advancing operation of the engine, so as to improve the exhaust gas quality. For this purpose, the vacuum fluid passage quantity is subjected to proper reduction so as to retard the attainment of fully advanced angle position of the distributor.

On the contrary, when the engine revolutional speed is reduced, the ignition time adjuster senses automatically a negative pressure reduction in the engine intake manifold and it is utilized to allow full passage of the vacuum pressure gaseous fluid, so as to adjust the ignition timing of the engine in its retardation-recovering sense.

In the conventional ignition timing adjuster, as its representative structural mode, a valve member made of sintered alloy and having an orifice opening is pressed into a housing of said adjuster, said housing having a passage opening for cooperation of said orifice and normally being closed by a resilient valve adapted for control of vacuum fluid for the necessary control of the ignition timing.

According to our study, it has been found that when the vacuum fluid pressure is led to act upon the resilient valve in its closing direction, optimum valve closure can be attained only with great difficulty.

SUMMARY OF THE INVENTION

It is therefore a first object of the invention to provide an improved vacuum-operated ignition adjuster which is fitted with a highly improved resilient valve devoid of such sealing troubles.

On the contrary, when the vacuum fluid is caused to act upon the resilient valve in its opening direction, extra-ordinarily large valving noises are normally encountered.

It is therefore a second object of the invention to provide an ignition timing adjuster of the above kind which can suppress the said kind of valving noises to a substantial degree.

These and further objects, features and advantages of the invention will become more apparent when read with the following detailed description of the invention by reference to the accompanying drawings illustrative of several preferred embodiments of the invention.

DISCUSSION OF THE PREFERRED EMBODIMENT

Figure 1:
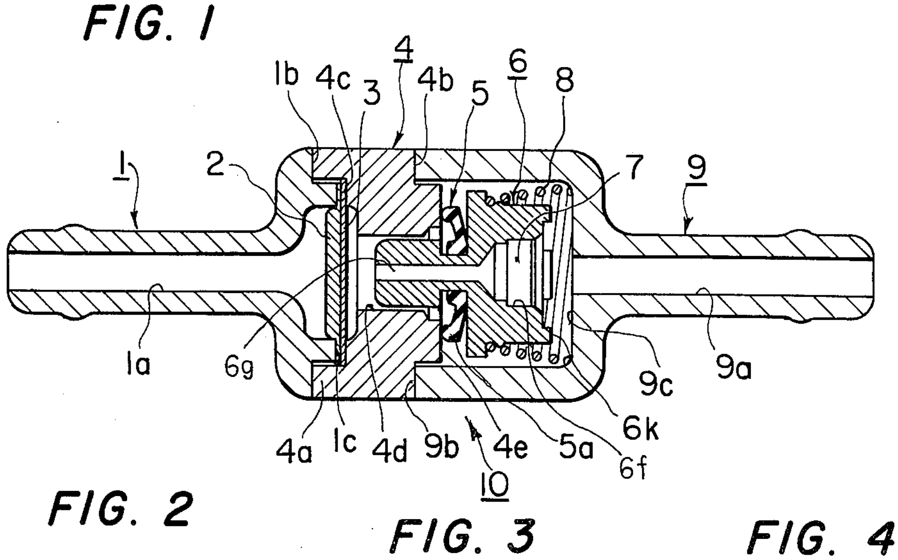
FIG. 1 is a longitudinal section of a first embodiment of the invention.

A first embodiment of the invention will be described in detail at first with reference to FIGS. 1-5.

In these figures, numerals 1, 4 and 9 represents three housing elements of an ignition time adjuster unit 10 according to this invention. These housing units are tightly and sealingly united together one after another by welding technique, especially by ultrasonic welding.

The first housing element 1 is formed with a unitary hollow pipe section **1*a* which is connected in a fluid tight manner with a branch socket 20*a* of an air-fuel mixture passage 20 of a conventional carburettor, not shown, through a connection piping 40. The element 1 is further formed a seat portion 1*b* for rigid connection with second housing element 4 in the aforementioned way, and with a cylindrical flange 1*c* for keeping a coarser filter element 2 and a finer filter element 3 under pressure in position between these housing elements 1 and 4. For this purpose, second housing element 4 is formed with a seat 4*c* adapted for cooperation with said cylindrical flange 1*c*. Naturally, the first filter element 3 is adapted for removal of coarser foreign particles from the filtering gaseous fluid and the finer filter element 4** removes finer particles included in the fluid therefrom.

Figure 2:
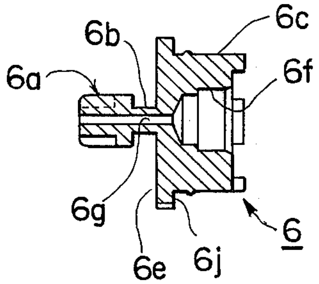
FIG. 2 is a longitudinal section of a valve stem employed in the device shown in FIG. 1 and taken along a section line II—II shown in FIG. 3.

Second housing element 4 is formed with a flanged seat portion **4*a* which engages said seat portion 1*b*, and with a further seat 4*b* for rigid connection with third housing element 10, and a central axial bore 4*d* receiving slidably a stem portion 6*a*, FIG. 2, of valve stem 6 for axial guidance thereof. The second housing element 4 is further formed with a seat 4*e* adapted for resilient contact with the outer end portion of a resilient valve member 5 when the latter is brought into its closing position. The valve stem 6 is axially bored through and this bored passage is divided into an enlarged diameter portion 6*f* and a reduced diameter one 6*g*** kept in fluid communication with each other, as shown.

Figure 5:
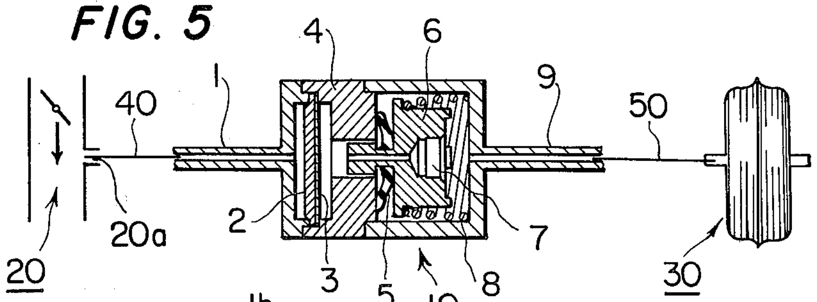
FIG. 5 is a schematic and substantially sectional view of a ignition timing adjusting system comprising as its main part the apparatus shown in FIG. 1, being illustrated on somewhat reduced scale in comparison with FIG. 1.

Third housing element comprises a hollow pipe portion **9*a* adapted for being coupled with a piping 50 connected with a conventional distributor vacuum advancer 30 shown in FIG. 5, a seat 9*b* sealingly and rigidly connected with said second housing element 4, and an inside end wall surface 9*c* adapted for contacting with said valve stem 6. In the drawing, said pipings 40** and 50 are shown in a highly simplified way by respective single straight lines only for simplicity of the drawing.

Said valve stem 6 comprises a stem portion 6*a*, a neck portion 6*b* positioned substantially at a midway of its length and a main body portion 6*c*, as most clearly be seen from FIG. 2.

The neck portion 6*b* represents a substantially U-shaped cross section for receiving said resilient valve member 5 and keeping the latter in position.

Figure 3:
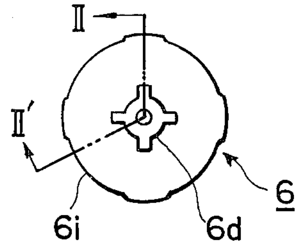
FIG. 3 is an end view of the valve stem shown in FIG. 2, when seen from left to right therein.
Figure 4:
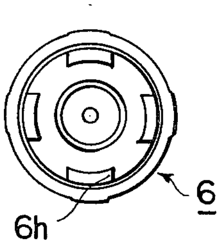
FIG. 4 is another end view of the valve stem shown in FIG. 2, when seen from right to left therein.

The main body portion 6*c* is formed with a ring flange 6*e* for providing a seat 6*j*, against which a conical coil spring abuts, for urging said resilient valve 5 towards the inner end surface 4*e* of second housing element 4. The main body 6*c* receives an orifice valve 7 at the said enlarged bore portion 6*f* and is formed with a plurality of radially arranged axial grooves 6*h*, shown in FIG. 4, which allow the gaseous fluid to pass therethrough when the valve stem 6 is brought into pressure contact with inside wall surface 9*c* of third housing element 9 under the influence of an increased gaseous fluid pressure occasionally prevailing in the interior space of first housing element 1 against the action of said coil spring 8. The flange portion 6*e* is formed with a plurality of peripheral recesses 6*i*, as shown in FIG. 3, allowing gaseous fluid flow to pass therethrough. In addition, said main body portion is formed with a plurality of end projections 6*k* adapted for serving as stop means cooperable with said wall surface 9*c*.

Dimensions of resilient valve 5, valve stem 6 and pressure spring 8 and all related parts to these working elements are so selected that normally when said spring 8 acts upon the resilient valve 5, the latter is kept at its closed position with its peripheral working area 5*a* tightly engaging the inner end surface 4*d* of second or middle housing element 4 and adapted for controlling the flow rate of gaseous fluid coming from the first and second housing elements 1; 4 and to flow through the third housing element.

Said orifice valve 7 is made of a porous metal or non-metallic substance, or most preferably of sintered alloy such as sintered tungsten carbide base material, and firmly held in position within the enlarged bore portion 6*f* by press fitting or the like conventional fixing means.

By altering the porous density of said orifice valve 7, or its thickness and or outside diameter, the gaseous fluid passage rate therethrough can naturally be changed as desired at the design stage.

If the pressure balance condition prevailing in the first and third housing elements 1 and 9 should become unbalanced, and the pressure in the former should become higher than that in the latter, the spring pressure at 8 will become rather latent, thereby the resilient valve 5 receding from its closing position and the sealing effect thereat becoming released. The outer and larger end of said spring 8 abuts on the inner wall surface 9*c* of the third housing element.

The operation of the first embodiment shown and described so far is as follows:

When the driver of a car fitted with the above ignition adjuster presses down the accelerating pedal, not shown from the idling condition of the internal combustion engine of the car, the sucking negative pressure at the suction manifold, not shown, of the engine will increase in its absolute value, the gaseous fluid will flow from within the third housing element 9 connected through piping 50 with vacuum advancer 30, via orifice valve 7, passage portions 6*f* and 6*g* and filters 2 and 3 into the inside space 1*a* of first housing element 1, thence through piping 40 and socket 20*a* into the passage duct 20, thereby the response at the advancer 30 being retarded relative to the pressure prevailing in the duct 20 and the engine power timing being correspondingly retarded.

If there should be no provision of orifice valve 7, the vacuum advancer 30 will react instantly with pressure variation in the duct 20, the desire ignition time retardation could not be realized.

Next, when the driver returns the accelerator pedal to its original position, the gaseous fluid pressure in the duct will recover its original higher value, thereby the pressure balance in and between first and third housing elements 1 and 9 being lost. Thus, the gaseous fluid will flow from within the interior space of first housing element 1 through filter elements 2 and 3 into the bore 4*d*, thence through a ring gap formed between the bore wall 4*d* and valve stem portion 6*a* and impinges upon the resilient valve 5, so as to open the latter by fluid pressure and to shift the valve stem 6 right wards in FIGS. 1 and 5. Even upon contacting engagement of the stop end 6*k* of valve stem 6 with said wall surface 9*c*, the fluid will continue to flow, and indeed, through the grooves 6*h* into the interior space of third housing element 9 and towards the vacuum advancer 30 for instantly adjusting the ignition timing of the engine so as to restore its original condition.

Figure 6:
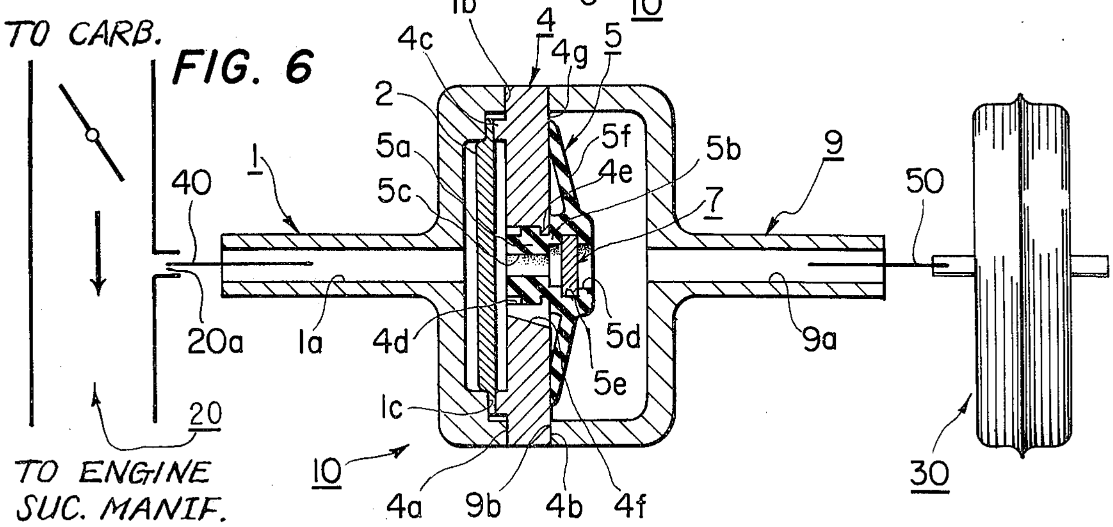
FIG. 6 is a similar view to FIG. 5, illustrating a second embodiment of the invention, being illustrated on somewhat larger scale in comparison with FIG. 5.

Next, referring to FIG. 6, a second embodiment of the invention will be described in detail.

It should be, however, noted that several parts or portions of the present embodiment such as those denoted 1; 1*a*; 1*b*; 1*c*; 2; 4; 4*a*; 4*b*; 4*c*; 5; 7; 9; 9*a*; 9*b*; 10; 20; 20*a*; 30 and 40 have been denoted respective same reference numerals to demonstrate similar parts or portions as before, regardless of occasional alteration in the configuration, for quicker identification and better understanding of the invention.

In the present embodiment, the finer filter element 3 has been omitted for simplification of the drawing.

The passage bore 4*d* in this case is formed with a longitudinal and tapered slot 4*f* and further with an inwardly projecting ring-shaped stop projection 4*e* for the prevention of occasional detachment of the modified resilient valve 5 from the second or middle housing element 4. The valve 5 comprises mainly a bevel portion 5*f* and a stem portion 5*a* made integral therewith, the latter being firmly held in the said bore 4*b*.

Second housing element 4 is formed with an inner end surface 4*g* substantially in the similar way to that shown at 4*e* in the first embodiment and adapted for valve closure engagement with the resilient bevel portion 5*f*. The stem portion 5*a* plays therefore somewhat different function from that portion denoted with the same reference numeral in the first embodiment. Said ring projection 4*e* is kept in snug engagement with a correspondingly shaped ring groove 5*b* formed on the said stem portion 5*a* which acts thus a different function from that denoted with the same reference numeral in the foregoing first embodiment.

The stem portion 5*a* is formed with an axially extending multi-stepped central bore 5*c*; 5*e* and 5*d*. 5*c* represents the most reduced diameter portion, while 5*e* represents the deepest ring groove portion which snugly receives orifice valve 7 which has the similar structure and function as those of the porous valve member denoted with the same reference numeral adopted in the first embodiment.

The operation of the present second embodiment is as follows:

When the driver depresses the accelerator pedal from the engine idling condition, the negative pressure prevailing in the duct will increase again in its absolute value.

Therefore, gaseous fluid will flow from within the interior space 9*a* of third housing element 9 through orifice valve 7, bore passage portions 5*d*; 5*c* and filter element 2 into the interior space 1*a* of first housing element 1, thence piping 40 and socket 20*a* into the passage duct 20. Therefore, in this case also, the operation of vacuum advancer 30 will retard in its response to the pressure reduction in the duct 20, thereby the engine ignition timing being correspondingly caused to retard.

When the driver releases his foot pedal pressure from accelerator pedal, the fluid pressure in the duct 20 will increase, thereby the engine suction pressure being reduced in its absolute value, correspondingly. By virtue of this pressure change in the duct 20, the pressure balance in and between the housing elements 1 and 9 becoming lost. The thus elevated gas pressure in the first housing element will flow from the duct 20, through socket 20*a*, bore space 1*a*, filter element 2 and longitudinal groove 4*f* acting thus upon the bevel portion 5*f* of resilient valve 5, so that the latter being caused to open by fluid pressure. Thus, the vacuum advancer 30 will be influenced instantly, so as to readjust the ignition timing condition of the engine.

Since in the first embodiment, the resilient valve is subjected to a spring pressure through the intermediary of the valve stem and acting in the valve-closing direction, the hitherto defective sealing function has been substantially improved over the conventional representative arrangement. When the vacuum fluid pressure is caused to act upon the resilient valve in its opening direction, fluctuating motion is absorbed by the said combination of valve spring and spring, thereby otherwise encountered valving noises being substantially depressed.

The arrangement of the orifice valve within the axial bore of the valve stem, the space requirement could be substantially improved. The provision of the fluid passage slots on the root end of the valve stem will improve the accuracy in the desired timing adjustment.

In the second embodiment, the aforementioned backup spring has been abolished, together with the valve stem. Instead, the resilient valve has been so designed and arranged that it can effectively act as these abolished elements, in addition to its own regular bore-on-off control action.

The embodiments of the invention in which an exclusive property or privilege is claimed are as follows:

1. A pneumatic control valve interposed between a pneumatic pressure soure and an actuator for controlling the air flow there between, comprising:

a housing including a bore therein and a radially extending partition wall having surfaces disposed within said bore for dividing said bore into two chambers, one of which is in communication with said actuator and the other of which is in communication with said pneumatic pressure source;

a communication passage provided in said partition wall for fluid communication between said two chambers;

a resilient valve body provided on said partition wall and sealably engagable with one surface of said partition wall for preventing direct air flow from one of said pneumatic pressure source and actuator through said communication passage to the other of said pneumatic pressure source and actuator and for allowing direct air flow from said other of said pneumatic pressure source and said actuator through said communication passage to said one of said pneumatic pressure source and said actuator;

said resilient valve body including an axial bore penetrating therethrough and an orifice means, sealably mounted in said axial bore, for retarding air flow through said axial bore from said one of said pneumatic pressure source and actuator through said axial bore to said the other of said pneumatic pressure source and said actuator.

2. A pneumatic control valve according to claim 1, wherein said resilient valve body includes a stem portion, which is secured to said communication passage of said partition wall such that said two chambers may communicate with each other through said communication passage and a bevel portion formed integral with said stem portion and positioned in one of said chambers to be sealably engagable with said one surface of said partition wall.

* * * * *